(12) United States Patent
Fuller et al.

(10) Patent No.: US 10,419,798 B2
(45) Date of Patent: Sep. 17, 2019

(54) METHOD AND APPARATUS FOR JUST-IN-TIME TRANSCODING

(71) Applicant: Synchronoss Technologies, Inc., Bridgewater, NJ (US)

(72) Inventors: Andrew Fuller, Dublin (IE); Robert Slotte, Helsinki (FI); Kuan Eeik Tan, Espoo (FI); Rauli Ikonen, Espoo (FI)

(73) Assignee: Synchronoss Technologies, Inc., Bridgewater, NJ (US)

(\*) Notice: Subject to any disclaimer, the term of this patent is extended or adjusted under 35 U.S.C. 154(b) by 112 days.

(21) Appl. No.: 15/388,474

(22) Filed: Dec. 22, 2016

(65) Prior Publication Data

US 2017/0188071 A1    Jun. 29, 2017

Related U.S. Application Data

(60) Provisional application No. 62/272,568, filed on Dec. 29, 2015, provisional application No. 62/272,388, filed on Dec. 29, 2015, provisional application No. 62/271,718, filed on Dec. 28, 2015.

(51) Int. Cl.
*H04N 5/445*    (2011.01)
*H04N 21/262*    (2011.01)
*H04L 29/06*    (2006.01)
*H04N 21/2343*    (2011.01)
*H04N 21/845*    (2011.01)

(52) U.S. Cl.
CPC ... *H04N 21/26258* (2013.01); *H04L 65/4084* (2013.01); *H04L 65/4092* (2013.01); *H04L 65/602* (2013.01); *H04L 65/607* (2013.01); *H04N 21/23439* (2013.01); *H04N 21/8455* (2013.01); *H04N 21/8456* (2013.01)

(58) Field of Classification Search
CPC .............. H04N 21/26258; H04N 21/44021
See application file for complete search history.

(56) References Cited

U.S. PATENT DOCUMENTS

| | | | | |
|---|---|---|---|---|
| 2005/0262529 | A1\* | 11/2005 | Neogi | H04N 7/1675 725/31 |
| 2009/0282443 | A1\* | 11/2009 | Kim | H04N 7/17318 725/88 |
| 2014/0040496 | A1\* | 2/2014 | Moorthy | H04L 65/4084 709/231 |
| 2014/0165120 | A1\* | 6/2014 | Losev | H04N 21/47202 725/97 |
| 2015/0288730 | A1\* | 10/2015 | Friedrich | H04L 65/607 709/219 |

\* cited by examiner

*Primary Examiner* — Gigi L Dubasky
(74) *Attorney, Agent, or Firm* — Synchronoss Technologies; Frederick W. Dour

(57) ABSTRACT

A computer implemented method and apparatus for just-in-time transcoding. The method comprises receiving at a media server, video content, wherein the video content comprises a plurality of key frames and delta frames; generating, in response to receiving the video content, metadata, wherein the metadata is a lookup table of the plurality of key frames; storing the video content and the metadata; receiving a first request to view video content; generating a playlist for the video content; receiving a second request to view a video segment of the video content; and transcoding the video segment; and transmitting the transcoded video segment.

17 Claims, 4 Drawing Sheets

METHOD AND APPARATUS FOR JUST-IN-TIME TRANSCODING

CROSS REFERENCE TO RELATED APPLICATIONS

This application claims benefit of U.S. Provisional Application Ser. No. 62/272,568, filed Dec. 29, 2015, U.S. Provisional Application Ser. No. 62/272,388, filed Dec. 29, 2015, and U.S. Provisional Application Ser. No. 62/271,718, filed Dec. 28, 2015, which are herein incorporated by reference in their entireties.

BACKGROUND OF THE INVENTION

Field of the Invention

Embodiments of the present invention generally relate to media delivery systems and, more particularly, to techniques for just-in-time transcoding.

Description of the Related Art

Media servers store and deliver media content. The two most common formats used for streaming media content are Hypertext Transfer Protocol (HTTP) Live Streaming (HLS) and Dynamic Adaptive Streaming over HTTP (DASH). Both formats involve breaking the media content into a sequence of small HTTP-based file downloads (i.e., video segments) that make up the overall media content. Media servers need to be able to deliver content in any format for any device (e.g. BLACKBERRY®, ANDROID®, iPHONE®, personal computer, web browser, television, and the like), and additionally provide the content in multiple resolutions based on network connectivity. The content may be delivered in a low quality when the network connection is slow, and in high quality when the network connection is fast. Often, large companies, such as NETFLIX® store the content in multiple formats and for each format, in multiple resolutions. The content is ready to be delivered immediately upon request from a user because the content was transcoded and stored before the user request was received. As such, latency (i.e., delay in receiving content) is not an issue.

Although storage is expensive, it is cost-effective for services such as NETFLIX to use the storage because NETFLIX delivers a small amount of content to a large number of users. However, for cloud storage service providers that store and deliver user generated content, storing the content in all formats and each format in all resolutions is cost-prohibitive. A user generated video may only be viewed once or twice, if at all. In addition, cloud storage service providers may be contractually required to store the original bytes of a video content as they were uploaded. However, cloud storage service providers, while avoiding wasted storage costs, still want to avoid latency and provide their users with fast downloads.

Therefore, there is a need for a method and apparatus for just-in-time transcoding.

SUMMARY OF THE INVENTION

A method and apparatus for just-in-time transcoding is provided.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

A method for just-in-time transcoding is described. The method comprises receiving at a media server, video content, wherein the video content comprises a plurality of key frames and delta frames; generating, in response to receiving the video content, metadata, wherein the metadata is a lookup table of the plurality of key frames; storing the video content and the metadata; receiving a first request to view video content; generating a playlist for the video content; receiving a second request to view a video segment of the video content; transcoding the video segment; and transmitting the transcoded video segment.

In another embodiment, a media server for just-in-time transcoding is described. The apparatus includes at least one processor; at least one input device; and at least one storage device storing processor-executable instructions which, when executed by the at least one processor, perform the method for just-in-time transcoding.

In yet another embodiment, a non-transitory computer readable medium for just-in-time transcoding is described. The computer readable medium stores computer instructions that, when executed by at least one processor causes the at least one processor to perform the method for just-in-time transcoding.

Other and further embodiments of the present invention are described below.

Figure 1:
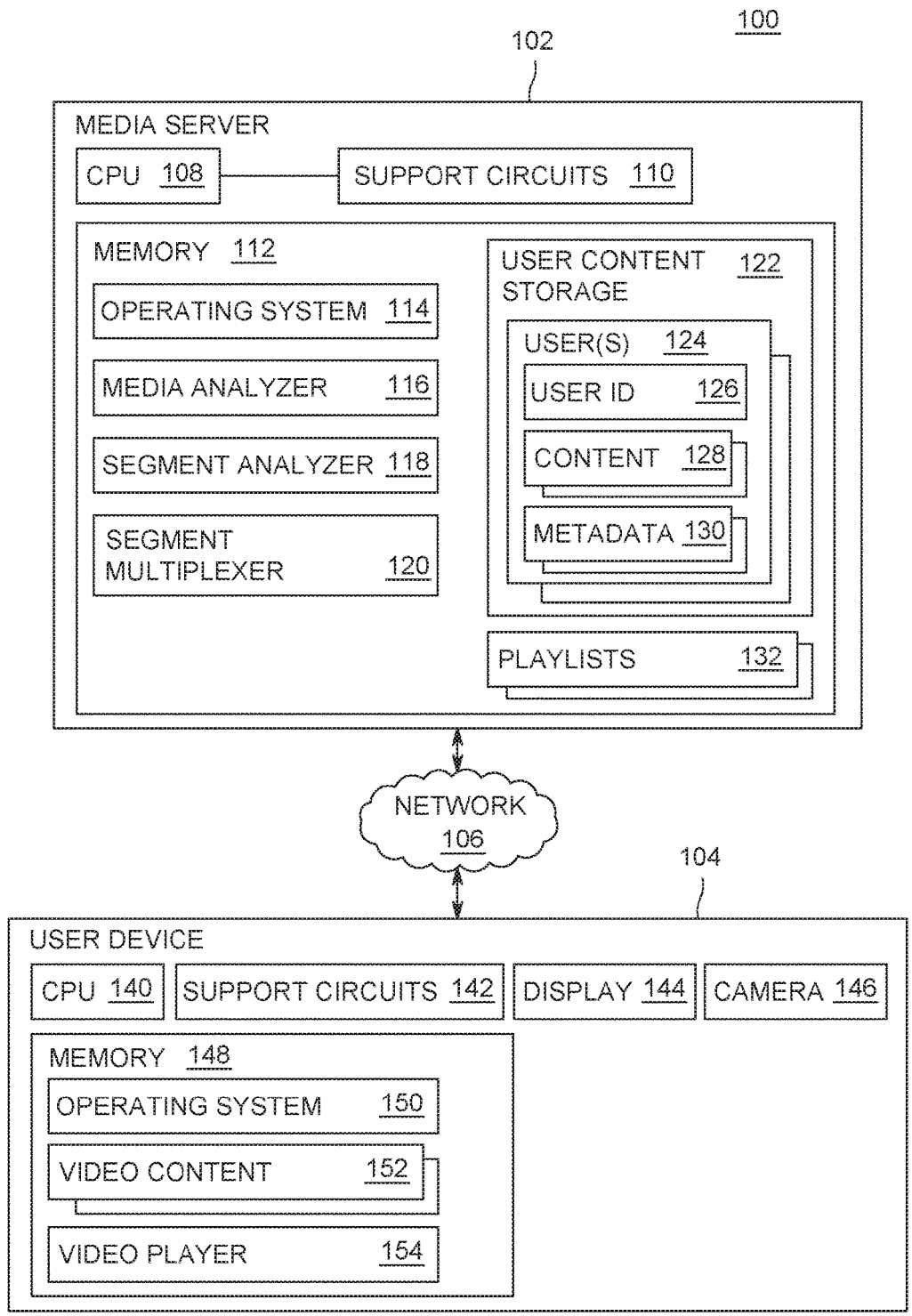
FIG. 1 is a block diagram of a system for just-in-time transcoding, according to one or more embodiments.

While the method and apparatus is described herein by way of example for several embodiments and illustrative drawings, those skilled in the art will recognize that the method and apparatus for just-in-time transcoding is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for just-in-time transcoding defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for just-in-time transcoding. When a user generated video is received on the cloud storage service provider server, a media analyzer stores the original video without manipulating the actual bytes of the uploaded video. Upon receipt of the video, the media analyzer generates metadata that identifies the byte numbers of the key frames as well as their time offsets for the entire video. The metadata is then stored with the original video for later use when a request is received for playback of the video. When a request from a user device is received, a sequence analyzer uses the metadata and original video to generate a playlist of video segments of the video for playback, and sends the playlist to the user device. The user device then requests the video segments, one segment of the video at a time, where each segment is approximately ten seconds. Based on the metadata and original video, a segment multiplexer transmits each requested video segment to the user device in an appropriate format for the user device and in the requested resolution. As such, the processor intensive task of generating the metadata is performed upon upload of the video. When a user requests playback of the video, the multiplexer can quickly transcode the bytes of the video into a correct format and deliver the segment to the user device with minimal latency.

Various embodiments of a method and apparatus for just-in-time transcoding are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for just-in-time transcoding, according to one or more embodiments. The system 100 includes a media server 102, that may be managed by a cloud storage service provider, and a user device 104, communicatively coupled to one another via a network 106.

The media server 102 is a computing device, for example, a desktop computer, laptop, tablet computer, and the like, or it may be a cloud based server (e.g., a blade server, virtual machine, and the like). One example of a suitable computer is shown in FIG. 5, which will be described in detail below. According to some embodiments, the media server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a media analyzer 116, a segment analyzer 118, and a segment multiplexer 120 for just-in-time transcoding, as well as user content storage 122 that includes a plurality of users 124, where each user includes a user ID 126, a plurality of multimedia content 128, and metadata 130 associated with each of the plurality of multimedia content 128, where the metadata is generated for each of the plurality of multimedia content 128 by the media analyzer 116. Lastly, a plurality of playlists 132 is stored, one playlist for each requested media content 128. The playlists 132 are stored in order to facilitate subsequent requests for the same media content 128. Although one media server 102 is shown, there may be multiple media servers managed by the cloud storage service provider.

The user device 104, and the media server 102 may be connected to external systems via a network 106, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

The user device 104 is a type of computing device for example, a mobile device, a desktop computer, laptop, tablet computer, gaming system, and the like associated with a client of the cloud storage service. One example of a suitable computer is shown in FIG. 5, which will be described in detail below.

The user device 104 includes a Central Processing Unit (CPU) 140, support circuits 142, a display 144, a camera 146, and a memory 148. The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 148 includes at least one of Read Only Memory (ROM), Random Access Memory (RAM), disk drive storage, optical storage, removable storage and/or the like.

The memory 148 includes an operating system 150, video content 152, and a video player 154. The camera 146 may be used to generate and store video content 152. The video player 154 may be a video player app on a smart phone, a browser on a computer, a video portal on a gaming system, and the like, capable of receiving and playing video content 152.

A user may generate video content 152 using for example, the camera 146 and store it with a cloud storage service provider that stores the video content 152 as content 128 associated with the user 124 on a media server 102. The content 128 includes key frames (also referred to as I-frames) in addition to delta frames (also referred to as P-frames). Generally, in video content, key frames are fully formed pictures that can be rendered on a screen. Delta frames only include what has changed in the frame since the previous video frame. Video content includes a key frame followed by multiple delta frames, followed by another key frame, followed by multiple delta frames, and so on. For example, a video has a key frame at byte 0 of the video, followed by delta frames. A next key frame may be at byte 3000 followed by additional delta frames. Approximately every ten seconds, a key frame is stored followed by additional delta frames.

Upon receiving and storing the content 128 on the media server, the media analyzer 116 generates metadata 130 for the content 128. The media analyzer 116 determines the byte location of a key frame as well as a time offset from the beginning of the video. Using the previous example, the first key frame is at byte 0, with a time offset 0 seconds from the beginning of the video. The second key frame is at byte 3000, which is 10.2 seconds into the video. The media analyzer 116 determines the byte location and time offset of every key frame in the content 128 and stores this information with the content 128 as metadata 130. The metadata 130 is basically a lookup table stored in a file. Nothing else is done with the content 128 or the metadata 130 until a user requests playback of the content 128.

When a user requests to view a playback of the content 128, the video player 154 sends a request to the segment analyzer 118, which generates a playlist that the video player 154 will use to request the content 128 for playback. A playlist is a file, for example, an Extensible Markup Language (XML) file. The playlist includes a menu of video segments. A video segment is piece of the content 128, approximately ten seconds in length. The video segments will be requested by the video player 154 and are typically requested one at a time. The network connection between the video player 154 and the media server 102 may not be consistent. For example, if the user is on a train, in some locations the network connection may be excellent. However, in some locations, for example, in a tunnel, the network connection may be poor. When a connection is poor, the video player 154 may request a video segment in a low resolution, while as the network connection improves, the video player 154 may request a video segment in a medium or high resolution.

The segment analyzer 118 generates the playlist which includes a list of links where to find each video segment in each resolution. Due to the fact that the video segments have not yet been created, these links are directed to virtual locations. The segment analyzer 118 accesses the metadata 130 to determine the segments that exist for the content 128. A segment consists of a key frame and the delta frames that follow the key frame. As a simplified example, if the content 128 is a 50-second video, the playlist may include five 10-second segments, in each of three resolutions (e.g., low, medium, and high). The playlist would then include fifteen links that each identifies where to retrieve each segment in each resolution. The segment analyzer 118 stores the playlist 132 and transmits the playlist 132 to the video player 154.

The video player 154 then sends a request for a segment to the segment analyzer 118. In the real world, where the cloud storage service provider manages a plurality of media servers 102, and/or where a media server 102 comprises a plurality of segment analyzers 118, the video player 154 sends the request to the segment analyzer 118 from which the playlist was received. The request may not be received in the order of the video. For example, where a user is fast forwarding or rewinding through the video, the request includes the time offset for the location of the video that the client has requested. In addition, the video player 154 includes information such as a type of user device 104 (e.g., BLACKBERRY®, ANDROID®, iPHONE®, web browser, etc.) that is making the request.

The segment analyzer 118 sends the request to the segment multiplexer 120. The segment multiplexer 120 transcodes the video segment based on the requested segment and the type of the user device 104. This process of requesting segments and transcoding the requested segments continues until the video ends or until the user stops playing the video.

Figure 2:
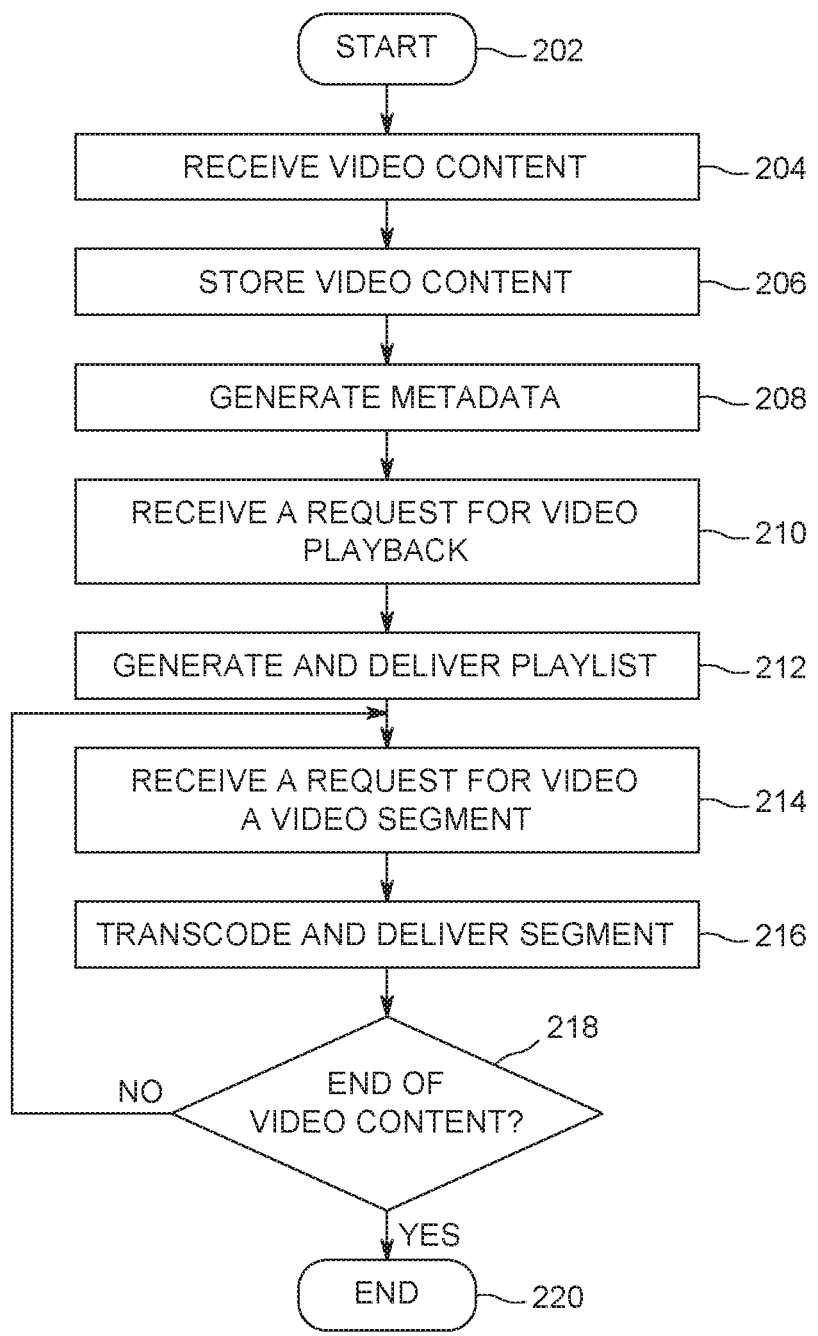
FIG. 2 depicts a flow diagram of a method for just-in-time transcoding, according to one or more embodiments.

FIG. 2 depicts a flow diagram of a method 200 for just-in-time transcoding, according to one or more embodiments. The method 200 is performed on a media server. The method 200 starts at step 202 and proceeds to step 204.

At step 204, video content is received at a media server. The media server is managed by a cloud storage service provider. The video is user-generated content received from a user device. As a cloud storage service provider, the video must be stored in its original state, with all bytes maintained.

At step 206, the video content is stored. The video content is stored in its original state. The video content may be stored on the media server. However, the video may be stored at a remote location accessible by the media server.

At step 208, metadata is generated for the video content. The metadata is a lookup table of key frames and a time offset for each of the key frames. The method for generating the metadata is described in more detail with respect to FIG. 3, below.

At step 210, a first request is received for playback of the video content. The request is received from a video player on a device of the user. At the time of the request, the video content is not prepared for playback. The video content needs to be broken into small segments and the segments transcoded for the video player.

At step 212, a playlist is generated for the video content and delivered to the video player. The playlist is a menu used by a video player to request video segments of the video content. The playlist includes a link where a video player may request each segment in each resolution available, such as low resolution, medium resolution, high resolution, ultra-high resolution, and the like. The playlist is generated by using the information in the metadata to identify video segments that make up the video content. For each key frame in the metadata, a video segment is identified. A video segment is a portion of video content comprising a key frame and the plurality of delta frames following the key frame. The playlist includes a segment number assigned to the video segment as well as a universal resource identifier link for each segment at each resolution. When the playlist includes a complete list of all segments that make up the video content, the playlist or a link to the playlist is transmitted to the video player on the user device.

At step 214, a second request is received from the video player, where the second request is for a specific segment of the video content. In some embodiments, the second request includes the identification of a type of codec for which the video segment is to be transcoded. The type of codec defines how the video segment needs to be transcoded. In some embodiments, the second request includes the identification of a type of device on which the video segment is to be played. From the type of device, the type of codec can be determined. For example, if a device is an iPHONE®, the segment requires an MP4 container that contains H.264 via codec ACA.

At step 216, the requested segment is transcoded and delivered to the video player for playback. At step 218, it is determined whether the end of the video content has been reached. If the end of the video has not been reached, then the method 200 proceeds to step 214 and iterates until at step 218, it is determined that the end of the content is reached, at which time the method 200 proceeds to step 220 and ends.

Figure 3:
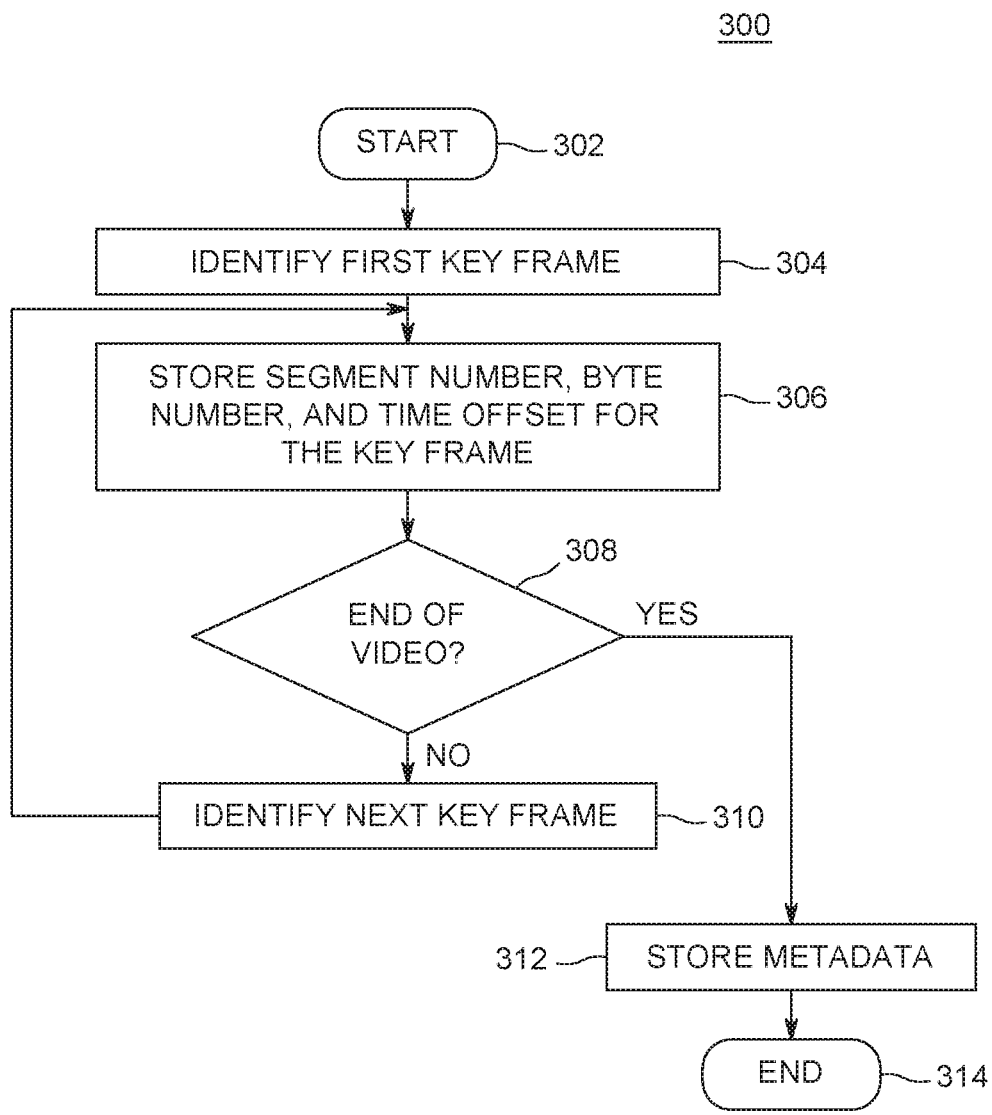
FIG. 3 depicts a flow diagram of a method for generating metadata for a media file, according to one or more embodiments.

FIG. 3 depicts a flow diagram of a method 300 for generating metadata for a media file, according to one or more embodiments. The method 300 starts at step 302 and proceeds to step 304.

At step 304, a first key frame of the video content is identified.

At step 306, the segment number, byte number, and time offset for the key frame is stored. The metadata is stored in a JavaScript Object Notation format (JSON-format) in an XML file. Each key frame is located using third party libraries, for example ffprobbe from external ffmpeg libraries.

At step 308, it is determined whether the end of the video content has been reached. If it is determined that the end of the video content has not been reached, then at step 310, the next key frame is identified and the method 300 proceeds to step 306, and iterates until it is determined that the end of the video content has been reached at which time the method proceeds to step 312. At step 312, the metadata file is stored and the method 300 ends at step 314.

Generating the metadata is a processor intensive endeavor. As such, the metadata is generated upon upload when there is time to process the video before a user makes a request for playback of the video.

Figure 4:
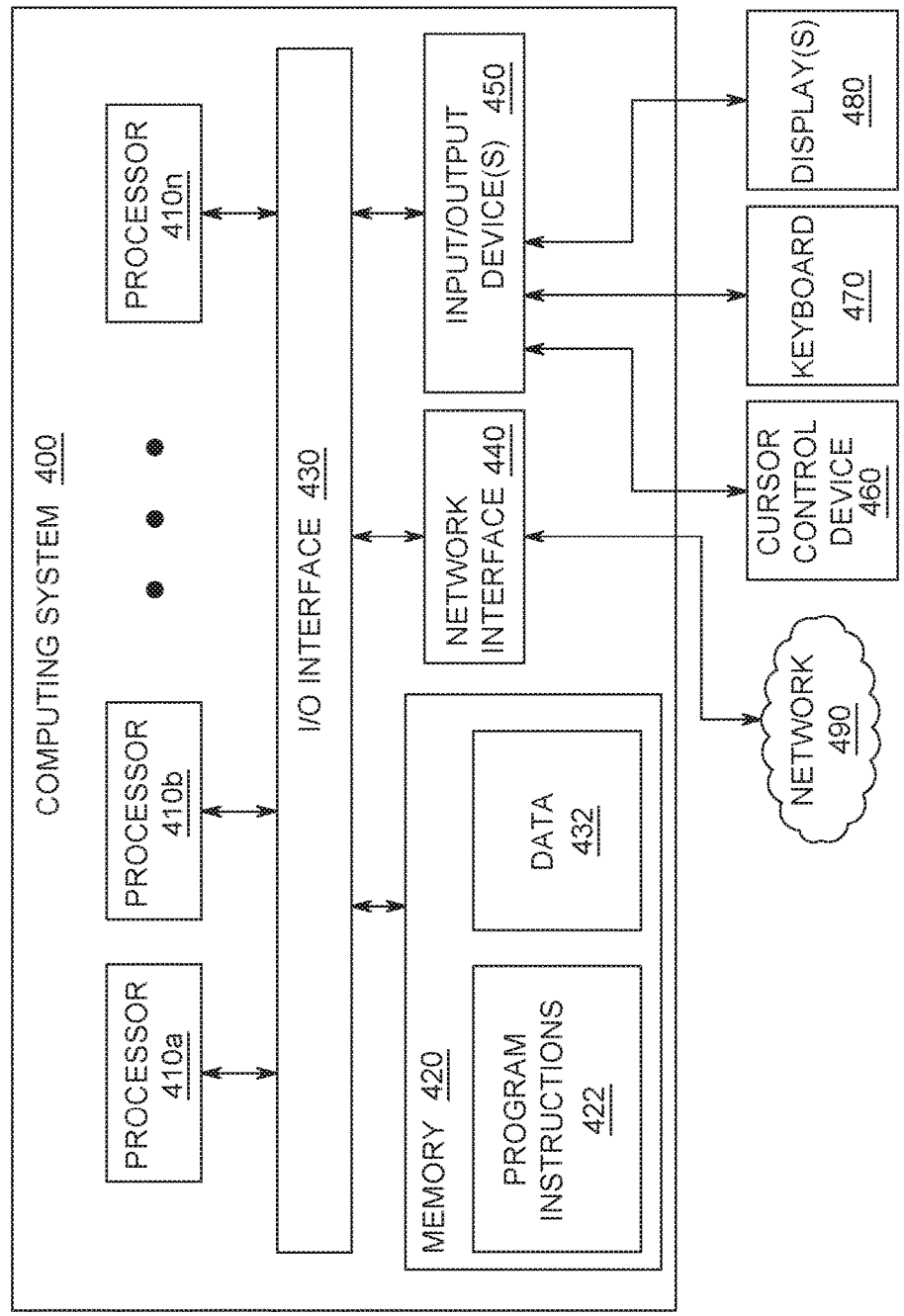
FIG. 4 depicts a computer system that can be utilized in various embodiments of the present invention to implement the computer and/or the display, according to one or more embodiments.

FIG. 4 depicts a computer system 400 that can be utilized in various embodiments of the present invention to implement the computer and/or the display, according to one or more embodiments.

Various embodiments of method and apparatus for just-in-time transcoding, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephone networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined.

The invention claimed is:

1. A computer implemented method for just-in-time transcoding comprising:
   receiving at a media server, video content, wherein the video content comprises a plurality of key frames and delta frames;
   generating, in response to receiving the video content, metadata, wherein the metadata is a lookup table of the plurality of key frames;
   storing the received video content in a format the video content was received and the generated metadata;
   receiving a first request to view video content;
   generating, in response to the first request, a playlist for the video content using the generated metadata;
   receiving a second request to view a video segment of the video content;
   transcoding, in response to the second request, the video segment; and
   transmitting the transcoded video segment,
   wherein generating the playlist comprises:
   performing a lookup of each key frame in the metadata;
   for each key frame in the video content:
   identifying a video segment as a portion of video comprising a key frame and the plurality of delta frames following the key frame; and identifying a segment number for the video segment, a byte number of the key frame, and a time offset of the key frame; and storing, as the playlist, a menu comprising a universal resource identifier link for each segment at each of a low resolution, medium resolution, and high resolution.

2. The method of claim 1, wherein the video content is user generated content.

3. The method of claim 1, wherein the metadata comprises a byte number of each key frame in the video content and a time offset for each key frame.

4. The method of claim 1, wherein storing the video content comprises storing a plurality of original bytes of the received video content.

5. The method of claim 1, wherein the first request is received from a video player.

6. The method of claim 1, wherein the second request identifies a type of video codec for which the video segment is to be transcoded.

7. A media server for just-in-time transcoding comprising:
a) at least one processor;
b) at least one input device; and
c) at least one storage device storing processor executable instructions which, when executed by the at least one processor, perform a method including:
receiving at a media server, video content, wherein the video content comprises a plurality of key frames and delta frames;
generating, in response to receiving the video content, metadata, wherein the metadata is a lookup table of the plurality of key frames;
storing the received video content in a format the video content was received and the generated metadata;
receiving a first request to view video content;
generating, in response to the first request, a playlist for the video content using the generated metadata;
receiving a second request to view a video segment of the video content; and
transcoding, in response to the second request, the video segment; and
transmitting the transcoded video segment,
wherein generating the playlist comprises:
performing a lookup of each key frame in the metadata;
for each key frame in the video content:
identifying a video segment as a portion of video comprising a key frame and the plurality of delta frames following the key frame; and
identifying a segment number for the video segment, a byte number of the key frame, and a time offset of the key frame; and
storing, as the playlist, a menu comprising a universal resource identifier link for each segment at each of a low resolution, medium resolution, and high resolution.

8. The media server of claim 7, wherein the video content is user generated content.

9. The media server of claim 7, wherein the metadata comprises a byte number of each key frame in the video content and a time offset for each key frame.

10. The media server of claim 7, wherein storing the video content comprises storing the original bytes of a plurality of original bytes of the received video content.

11. The media server of claim 7, wherein the first request is received from a video player.

12. The media server of claim 7, wherein the second request identifies a type of video codec for which the video segment is to be transcoded.

13. A non-transitory computer readable medium for storing computer instructions that, when executed by at least one processor causes the at least one processor to perform a method for just-in-time transcoding comprising:
receiving at a media server, video content, wherein the video content comprises a plurality of key frames and delta frames;
generating, in response to receiving the video content, metadata, wherein the metadata is a lookup table of the plurality of key frames;
storing the received video content in a format the video content was received and the generated metadata;
receiving a first request to view video content;
generating, in response to the first request, a playlist for the video content using the generated metadata;
receiving a second request to view a video segment of the video content;
transcoding, in response to the second request, the video segment; and
transmitting the transcoded video segment,
wherein generating the playlist comprises:
performing a lookup of each key frame in the metadata;
for each key frame in the video content:
identifying a video segment as a portion of video comprising a key frame and the plurality of delta frames following the key frame; and
identifying a segment number for the video segment, a byte number of the key frame, and a time offset of the key frame; and
storing, as the playlist, a menu comprising a universal resource identifier link for each segment at each of a low resolution, medium resolution, and high resolution.

14. The non-transitory computer readable medium of claim 13, wherein the video content is user generated content.

15. The non-transitory computer readable medium of claim 13, wherein the metadata comprises a byte number of each key frame in the video content and a time offset for each key frame.

16. The non-transitory computer readable medium of claim 13, wherein storing the video content comprises storing a plurality of original bytes of the received video content.

17. The non-transitory computer readable medium of claim 13, wherein the second request identifies a type of video codec for which the video segment is to be transcoded.

* * * * *